April 29, 1924.  R. J. NETZEL ET AL  1,491,877
TIRE PROTECTOR
Filed Sept. 6, 1921   2 Sheets-Sheet 1

Inventor
R. J. NETZEL
W. H. EYNON

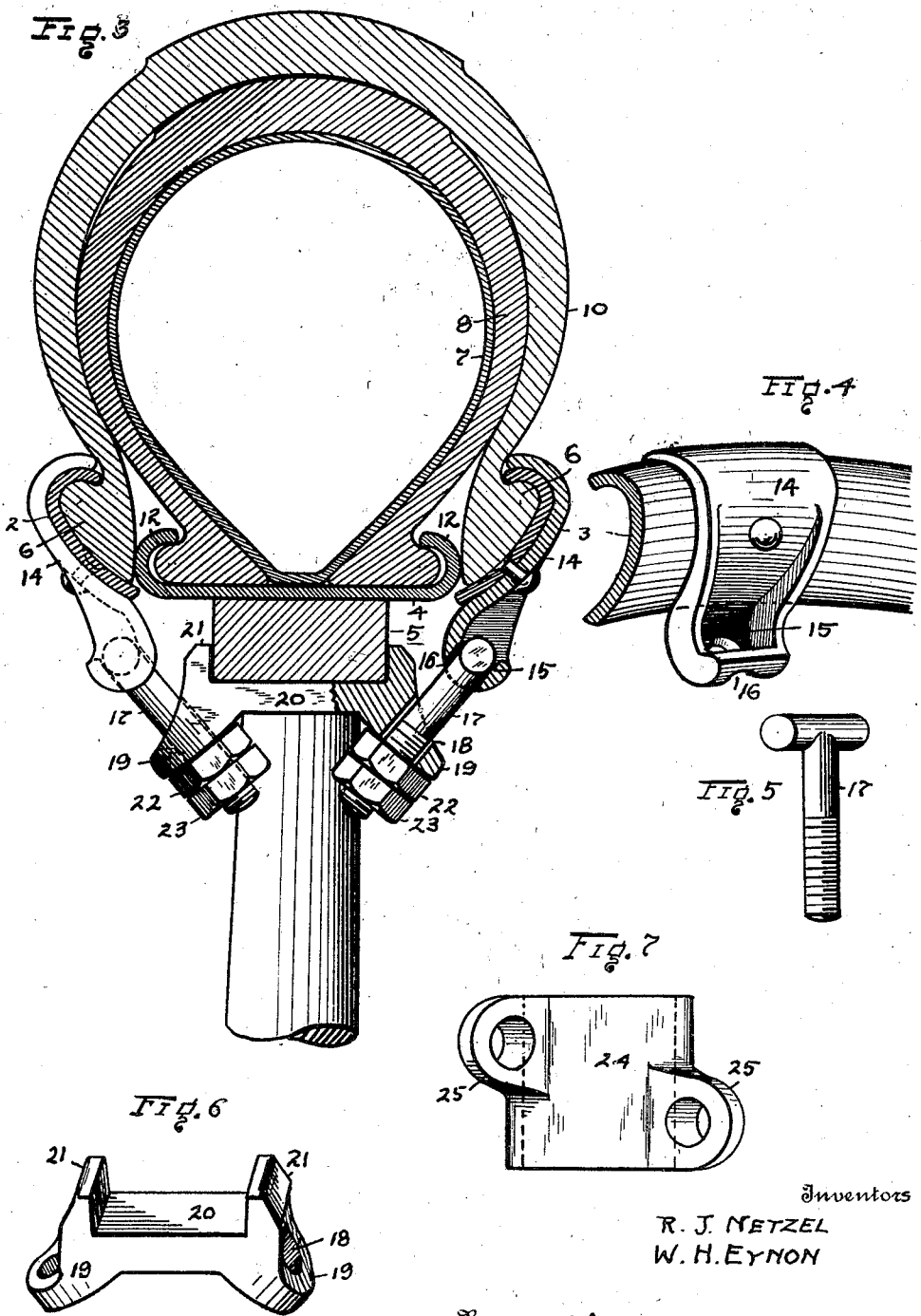

Patented Apr. 29, 1924.

1,491,877

UNITED STATES PATENT OFFICE.

RICHARD J. NETZEL AND WILLIAM H. EYNON, OF CLEVELAND, OHIO, ASSIGNORS TO THE STANDARD TIRE PROTECTOR COMPANY, OF CLEVELAND, OHIO, A CORPORATION OF DELAWARE.

TIRE PROTECTOR.

Application filed September 6, 1921. Serial No. 498,718.

*To all whom it may concern:*

Be it known that we, RICHARD J. NETZEL and WILLIAM H. EYNON, citizens of the United States, residing at Cleveland, in the county of Cuyahoga and State of Ohio, have invented certain new and useful Improvements in a Tire Protector, of which the following is a specification.

Our invention pertains to pneumatic vehicle tires, and the general object of the invention is to provide a simple and practical clamping device adapted to securely fasten separate sectional or segmental portions of a tire casing in an enveloping position upon a pneumatic tire tube and casing of a vehicle wheel, and the clamping device is particularly constructed to permit its quick attachment and detachment to vehicle wheels and rims of different sizes and to effect clamping of the beaded portion of the supplemental enveloping casing sections at all points annularly opposite the rim of the wheel, using channeled rings having overlapping extremities in slidable engagement adapted to permit said rings to be contracted and expanded. An old or used tire casing, for example a casing which has been damaged at some radial place therein, as in a blow out, can be used as a protecting casing for a tire on a wheel by merely cutting out the segmental damaged portion of the used tire casing, when enveloping the tire on the wheel with this section plus one or more smaller sections, and then clamping the sections jointly upon the partially deflated tire on the wheel through the medium of a pair of contractible rings and a set of pulling elements loosely connected with said rings all particularly arranged and related to the felly of the wheel so that the pull is on angular lines converging toward the felly and rim and inwardly toward the axis of the wheel.

Figure 1:
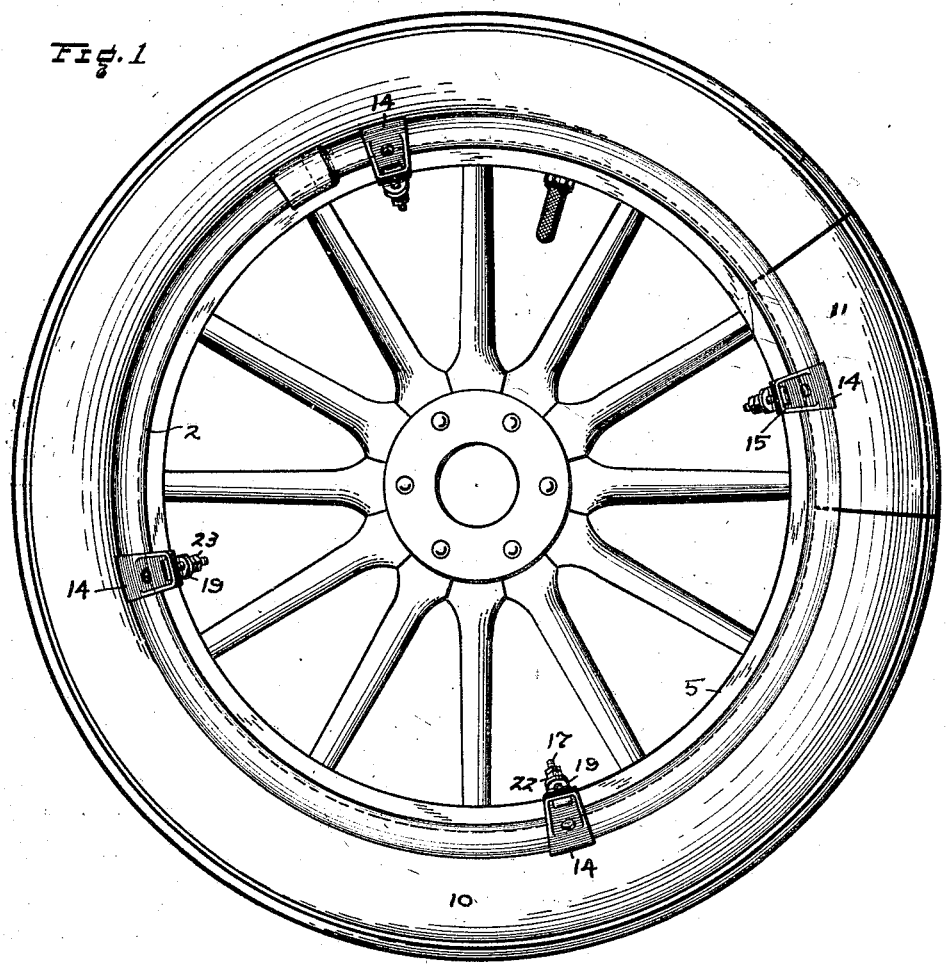
Figure 2:
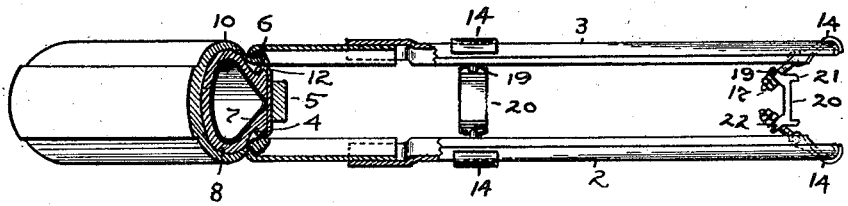

In the drawings accompanying this application, Fig. 1 is a side elevation of a vehicle wheel having a pneumatic tire enveloped by a supplementary casing formed in a major and minor section clamped in place by our improved clamping device. Fig. 2 is a plan view of a portion of a vehicle wheel and a tire and a protecting casing, together with a pair of clamping rings and their associated clamping means, the overlapping ends of said rings being shown in section. Fig. 3 is an enlarged cross section of the rim portion of a vehicle wheel having a pneumatic tire placed thereon showing also the protective casing upon the tire and our improved clamping device for said casing. Fig. 4 is a perspective view of a portion of one of the clamping rings showing one of the clips or hooks riveted to the outer side thereof. Fig. 5 is a perspective view of a clamping bolt having a T-shaped head adapted to be pivotally connected with the said clip or hook. Fig. 6 is a perspective view of one form of a clamping bracket adapted to engage the felly of the wheel and to be used with the clamping bolts, and Fig. 7 is an inner face view of a modified form of bracket.

The invention comprises a pair of split rings 2 and 3 respectively, each of which are curved in cross section to correspond to the outer curvature of the beaded portion of tire casings in general use, such tire casings for example as used in clencher rims. Thus, in Fig. 1 we show a cross section of a portion of a vehicle wheel comprising a clencher rim 4 mounted upon a wooden felly 5, and a pneumatic tire comprising an inner tube 7 and a divided casing 8 is also shown as secured within the rim. A second tire shoe or casing 10 is sleeved upon tire casing 8, and an old casing of the same kind and size as the regular casing 8 may be used, but it must be first divided or split radially so that it may be readily expanded to envelop and fit casing 8 circumferentially. In so doing a gap or space is left between the divided ends of the enveloping casing which gap is filled in with one or more smaller segmental pieces 11 of a tire casing, and the toes or beads 6 of the enveloping sections 10 and 11 extend downwardly on either side of the rounded flanges 12 of rim 4. Then when rings 2 and 3 are applied to toes or beads 6 the said toes or beads are adapted to be compressed against the sides of the rim and also drawn inwardly toward the axis of the wheel. In this action it is necessary that the split rings 2 and 3 shall be free to contract to a smaller diameter and to facilitate such contraction each ring is constructed to overlap where radially divided, one end being offset and the other end free to slide within this offset, see Figs. 1 and 2. Each clamping ring is provided with a series of hook-shaped clips 14 riveted upon the outer sides thereof and as shown four such clips are affixed to the rings at uniform distances apart and with one of the clips relatively near the offset overlapping ends of the ring where divided. Each clip has a rounded recess or seat 15 at its lower end which projects beyond the inner circumferential edge of the ring, and a round opening 16 is formed in the bottom side of said rounded seat through which the stem of a T-shaped bolt or screw 17 is adapted to project at an angle toward the middle of the wheel with the round T-shaped end of the bolt loosely seated in recess 15, the bolt being free to play within limits so that the same clamping device may be readily applied and used on wheels having fellys of different width. The clips on the respective clamping rings are placed opposite one another when the device is applied to a wheel, so that the bolt 17 engaged with the clips may extend on converging lines toward each other to pass through inclined openings 18 in the inclined ears 19 of a felly engaging bracket or plate 20 having upwardly extending lugs 21 at each end adapted to engage the sides of the felly to prevent said plate from shifting laterally when mounted upon the felly. The openings 18 are of larger diameter than bolts 17 so that they may be freely connected at different angles to the bracket or plate 20, and to facilitate such attachment further the bottom inclined faces 21 of the ears 19 are curved or rounded where the nuts 22 for the bolts are adapted to seat and engage the ears. Lock nuts 23 are also used to assure a permanent locking of the parts together and the intervening space between the ears 19 is amply sufficient to permit the nuts to be engaged and operated by a suitable wrench. In Fig. 7 we show a felly bracket or plate 24 which corresponds closely to bracket plate 20 but which is provided with inclined perforated ears 25 in offset relation to each other so that the nuts may be reached and turned by a wrench without interference.

What we claim is:

A tire protecting device, comprising a pair of divided clamping rings adapted to be contracted and expanded, each ring being provided with a series of clips having end sockets, T-shaped fastening bolts loosely engaged within the sockets of said clips, and felly engaging members adapted to be detachably engaged by said bolts.

RICHARD J. NETZEL.
WILLIAM H. EYNON.